(12) United States Patent
Reifel

(10) Patent No.: US 10,405,121 B2
(45) Date of Patent: Sep. 3, 2019

(54) WIRELESS SPLITTER-REPEATER HUB

(71) Applicant: Gary Reifel, Brazoria, TX (US)

(72) Inventor: Remington Reifel, Brazoria, TX (US)

(73) Assignee: Gary Reifel, Brazoria, TX (US)

( * ) Notice: Subject to any disclaimer, the term of this patent is extended or adjusted under 35 U.S.C. 154(b) by 51 days.

(21) Appl. No.: 15/684,833

(22) Filed: Aug. 23, 2017

(65) Prior Publication Data

US 2018/0063663 A1    Mar. 1, 2018

Related U.S. Application Data

(60) Provisional application No. 62/379,463, filed on Aug. 25, 2016.

(51) Int. Cl.
*H04S 3/00* (2006.01)
*H04H 60/27* (2008.01)
(Continued)

(52) U.S. Cl.
CPC ............... *H04S 3/006* (2013.01); *G06F 3/16* (2013.01); *H04H 20/61* (2013.01); *H04H 60/27* (2013.01);
(Continued)

(58) Field of Classification Search
CPC ... H04B 5/0031; H04B 7/15507; H04S 3/006; H04H 60/27
(Continued)

(56) References Cited

U.S. PATENT DOCUMENTS 6,970,940 B1   11/2005   Vogel et al.
7,912,020 B2   3/2011   Khasawneh et al.
(Continued)

FOREIGN PATENT DOCUMENTS

JP   2010519976 A   6/2010
JP   2017034563 A   2/2017
(Continued)

OTHER PUBLICATIONS

B1 Bluetooth Music Receiver. Shop [online]. Audioengine, LLC, 2017 [retrieved on Jul. 21, 2017] Retrieved from the Internet: <URL: https://audioengineusa.com/shop/adapters/b1-bluetooth-music-received>.
(Continued)

*Primary Examiner* — John J Lee
(74) *Attorney, Agent, or Firm* — Craige Thompson; Thompson Patent Law

(57) ABSTRACT

Apparatus and associated methods relate to a wireless receiver module, and a plurality of transmitter modules, the receiver module configured to convert a wireless protocol signal to an audio baseband signal, each transmitter module operable to receive the audio baseband signal, and adapted to convert the audio baseband signal to a unique wireless protocol signal for transmission over an independent communication channel to a respective wireless audio output device. In an illustrative example, a wireless repeater hub (WRH) may pair a master transceiver (within the WRH) with a master audio source. The master transceiver may demodulate the audio information, and send it to a plurality of slave transceivers. Each slave transceiver within the WRH is paired to a respective individual audio transducer. Various embodiments may facilitate a wireless music datastream from a personal electronic device (PED) to be played on multiple wireless audio transducers via unique and distinct wireless channels.

16 Claims, 3 Drawing Sheets

(51) Int. Cl.
*H04N 21/414* (2011.01)
*G06F 3/16* (2006.01)
*H04H 20/61* (2008.01)
*H04N 21/436* (2011.01)
*H04N 21/81* (2011.01)
*H04R 27/00* (2006.01)
*H04R 5/033* (2006.01)
*H04R 5/04* (2006.01)
*H04S 7/00* (2006.01)

(52) U.S. Cl.
CPC . *H04N 21/41407* (2013.01); *H04N 21/43615* (2013.01); *H04N 21/8113* (2013.01); *H04R 27/00* (2013.01); *H04R 5/0335* (2013.01); *H04R 5/04* (2013.01); *H04R 2205/024* (2013.01); *H04R 2420/05* (2013.01); *H04R 2420/07* (2013.01); *H04S 7/308* (2013.01)

(58) Field of Classification Search
USPC ......... 455/7, 41.1, 41.2, 41.3, 11.1, 22, 502, 455/511, 517, 67.11
See application file for complete search history.

(56) References Cited

U.S. PATENT DOCUMENTS

| | | | |
|---|---|---|---|
| 8,054,987 | B2 | 11/2011 | Seydoux |
| 8,295,766 | B2 | 10/2012 | Zimbric et al. |
| 8,401,520 | B2 | 3/2013 | Govindachari et al. |
| 8,632,408 | B2 | 1/2014 | Gillo et al. |
| 8,816,813 | B2 | 8/2014 | Tondering |
| 9,444,565 | B1 | 9/2016 | Leopardi et al. |
| 2005/0186907 | A1 | 8/2005 | Tailor |
| 2006/0046656 | A1 | 3/2006 | Yang |
| 2007/0066360 | A1 | 3/2007 | Sato et al. |
| 2007/0160225 | A1 | 7/2007 | Seydoux |
| 2007/0223725 | A1 | 9/2007 | Neumann et al. |
| 2009/0298420 | A1 | 12/2009 | Haartsen et al. |
| 2011/0129048 | A1 | 6/2011 | Barbe et al. |
| 2011/0222549 | A1 | 9/2011 | Connelly et al. |
| 2011/0255692 | A1* | 10/2011 | Soliman .............. H04L 63/0492 380/270 |
| 2012/0071244 | A1 | 3/2012 | Gillo et al. |
| 2012/0300944 | A1 | 11/2012 | Spittle |
| 2013/0232538 | A1 | 9/2013 | Johnson |
| 2013/0316649 | A1 | 11/2013 | Newham |
| 2014/0213226 | A1 | 7/2014 | Filev et al. |
| 2016/0134357 | A1* | 5/2016 | Dussmann ......... H04B 7/15507 370/315 |
| 2016/0150011 | A1* | 5/2016 | Le Nerriec .... H04N 21/234309 709/205 |
| 2017/0118582 | A1 | 4/2017 | Lou et al. |
| 2017/0270774 | A1* | 9/2017 | Fateh ................. A45D 40/0068 |

FOREIGN PATENT DOCUMENTS

| | | |
|---|---|---|
| WO | 2007067550 A2 | 6/2007 |
| WO | 2007112177 A3 | 10/2007 |
| WO | 2008104782 A2 | 9/2008 |
| WO | 2008104782 A3 | 9/2008 |

OTHER PUBLICATIONS

Block Party Wireless Multiroom Bluetooth Speaker. Shop [online]. JLab Audio, 2017 [retrieved on Jul. 29, 2017] Retrieved from the Internet: <URL: https://www.jlabaudio.com/collections/bluetooth/products/block-party-wireless-bluetooth-speaker>.

Riitop Bluetooth Transmitter Receiver Wireless A2DP Audio Wireless 3.5mm Bluetooth 2in1 Adapter for TV. Product [online]. Newegg, 2017 [retrieved on Jul. 29, 2017] Retrieved from the Internet: <URL: https://www.newegg.com/Product/Product.aspx?Item=9SIA6V855P5935&cm_re=b6-_-1GK-001F-00009-_-Product>.

* cited by examiner

WIRELESS SPLITTER-REPEATER HUB

CROSS-REFERENCE TO RELATED APPLICATIONS

This application claims the benefit of U.S. Provisional Application Ser. No. 62/379,463 titled "Multitooth," filed by Remington Reifel on Aug. 25, 2016.

This application incorporates the entire contents of the foregoing application(s) herein by reference.

TECHNICAL FIELD

Various embodiments relate generally to wireless entertainment systems.

BACKGROUND

Music has been enjoyed by people around the globe, making its way into nearly every culture. For example, music has weaved its way into movie making, religious worship, and even military and sporting ceremonies, and may invoke emotion, courage, and pride. Individuals may enjoy music in various forms. For instance, some may attend concerts, enjoying music as a group, and others may enjoy music on a personal level.

Advances in electronics and mechanics have enabled individuals to enjoy music on-the-go. For example, automobiles may be outfitted with various audio components, allowing motorists to enjoy music while traveling. Individuals may employ various headphones coupled to various audio component to enjoy music while walking, running, or biking, for example.

Further advances in electronics may now facilitate wireless connection between an audio source (e.g., smart phones) and an audio transducer (e.g., headphones). This type of wireless connection may conveniently free users from wires connecting the audio sources to the audio transducers.

SUMMARY

Apparatus and associated methods relate to a wireless receiver module, and a plurality of transmitter modules, the receiver module configured to convert a wireless protocol signal to an audio baseband signal, each transmitter module operable to receive the audio baseband signal, and adapted to convert the audio baseband signal to a unique wireless protocol signal for transmission over an independent communication channel to a respective wireless audio output device. In an illustrative example, a wireless repeater hub (WRH) may pair a master transceiver (within the WRH) with a master audio source. The master transceiver may demodulate the audio information, and send it to a plurality of slave transceivers. Each slave transceiver within the WRH is paired to a respective individual audio transducer. Various embodiments may facilitate a wireless music data-stream from a personal electronic device (PED) to be played on multiple wireless audio transducers via unique and distinct wireless channels.

Various embodiments may achieve one or more advantages. For example, the WRH system may split an audio data-stream from a Bluetooth-enabled master audio device (e.g., PED) to multiple Bluetooth-enabled audio transducers (e.g., wireless speakers). The system may be advantageously employed in, for example, fitness clubs, churches, and homes. Multiple personal wireless audio transducers (for example, multiple wireless headphones) may simultaneously receive wireless media (e.g., music) from a single wireless audio source, by employment of the WRH. In some examples, the WRH system may advantageously operate without leveraging existing wireless infrastructure (e.g., WiFi).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an illustrative use-case of an exemplary wireless repeater hub (WRH) is briefly introduced with reference to FIG. 1. Second, with reference to FIGS. 2 and 3, the discussion turns to exemplary embodiments that illustrate functional and electrical configurations.

Figure 1:
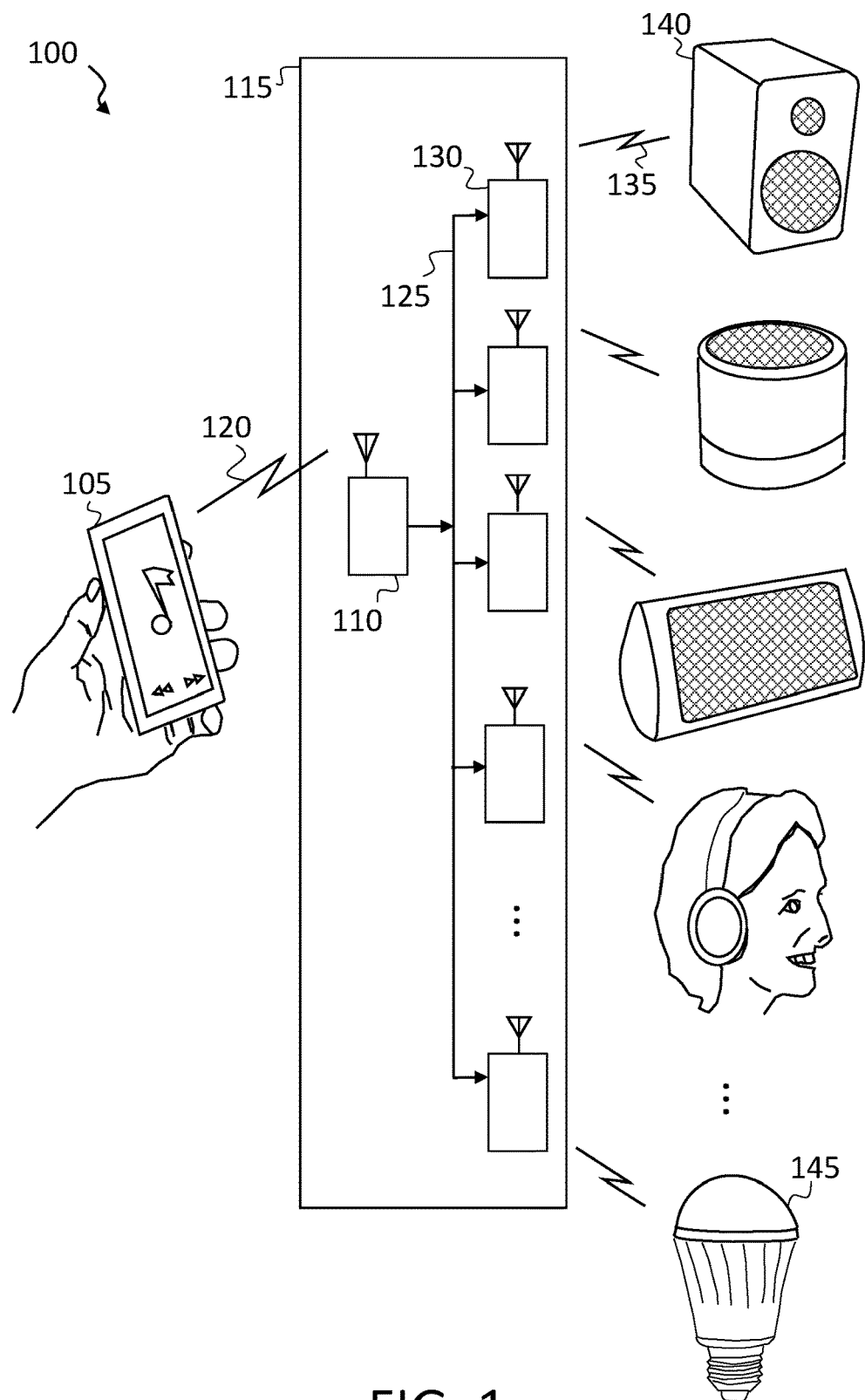
FIG. 1 depicts an exemplary wireless repeater hub (WRH) employed in an illustrative use-case scenario.

FIG. 1 depicts an exemplary point-to-point wireless repeater hub (WRH) employed in an illustrative use-case scenario. A use-case scenario 100 includes a point-to-point wireless media player (P2PWMP) 105. In some examples, the P2PWMP 105 may be a Bluetooth-enabled cellular phone. The P2PWMP 105 is depicted wirelessly coupled to a point-to-point head master transceiver 110. The point-to-point head master transceiver 110 is included within a WRH 115. The point-to-point head master transceiver 110 is configured to receive a first wireless media data-stream 120. The point-to-point head master transceiver 110 is also configured to demodulate the first wireless media data-stream 120 to an analog or digital audio baseband signal 125. The audio baseband signal 125 is electrically coupled to a point-to-point slave transceiver 130. As depicted, the multiple point-to-point slave transceivers 130 may be employed within the WRH 115, each of the point-to-point slave transceivers 130 being coupled to, and fed by, the audio baseband signal 125, in a parallel fashion. Each of the point-to-point slave transceivers 130 is individually configured to transmit a unique second wireless media data-stream 135. Each of the unique second wireless media data-streams 135 is operable to couple to a wireless slave audio receiver 140. As depicted, one of the second wireless media data-streams 135 is coupled to a Bluetooth color bulb 145. The color bulb 145 may produce various color light flashes in response to the second wireless media data-streams 135 which may advantageously produce a pleasing visual effect set to the music from the wireless media data-streams 135.

In various examples, the point-to-point head master transceiver 110, the point-to-point slave transceiver 130 and the audio baseband signal 125 may be contained on a common printed circuit board (PCB) within the WRH 115. This common containment may advantageously provide a convenient package to port the WRH 115 from place to place.

In some examples, the audio baseband signal 125 may couple the point-to-point head master transceiver 110 to the point-to-point slave transceiver 130 via a wired connection. Further, in some examples, the audio baseband signal 125 may couple the point-to-point head master transceiver 110 to the point-to-point slave transceiver 130 via a patch cord within the WRH 115.

In some examples, the wireless slave audio receivers 140 may be operable to produce an audible representation of the wireless media data-steams 135. In various examples, the wireless slave audio receivers 140 may be operable to produce a visual representation (e.g., Bluetooth color bulb 145) of the wireless media data-steams 135. In further examples, the wireless slave audio receivers 140 may be operable to produce a tactile representation of the wireless media data-steams 135. Accordingly, the WRH 115 may facilitate the wireless music data-stream 120 from the P2PWMP 105 to be played on multiple wireless slave audio receivers 140 via wireless media data-streams 135.

Figure 2:
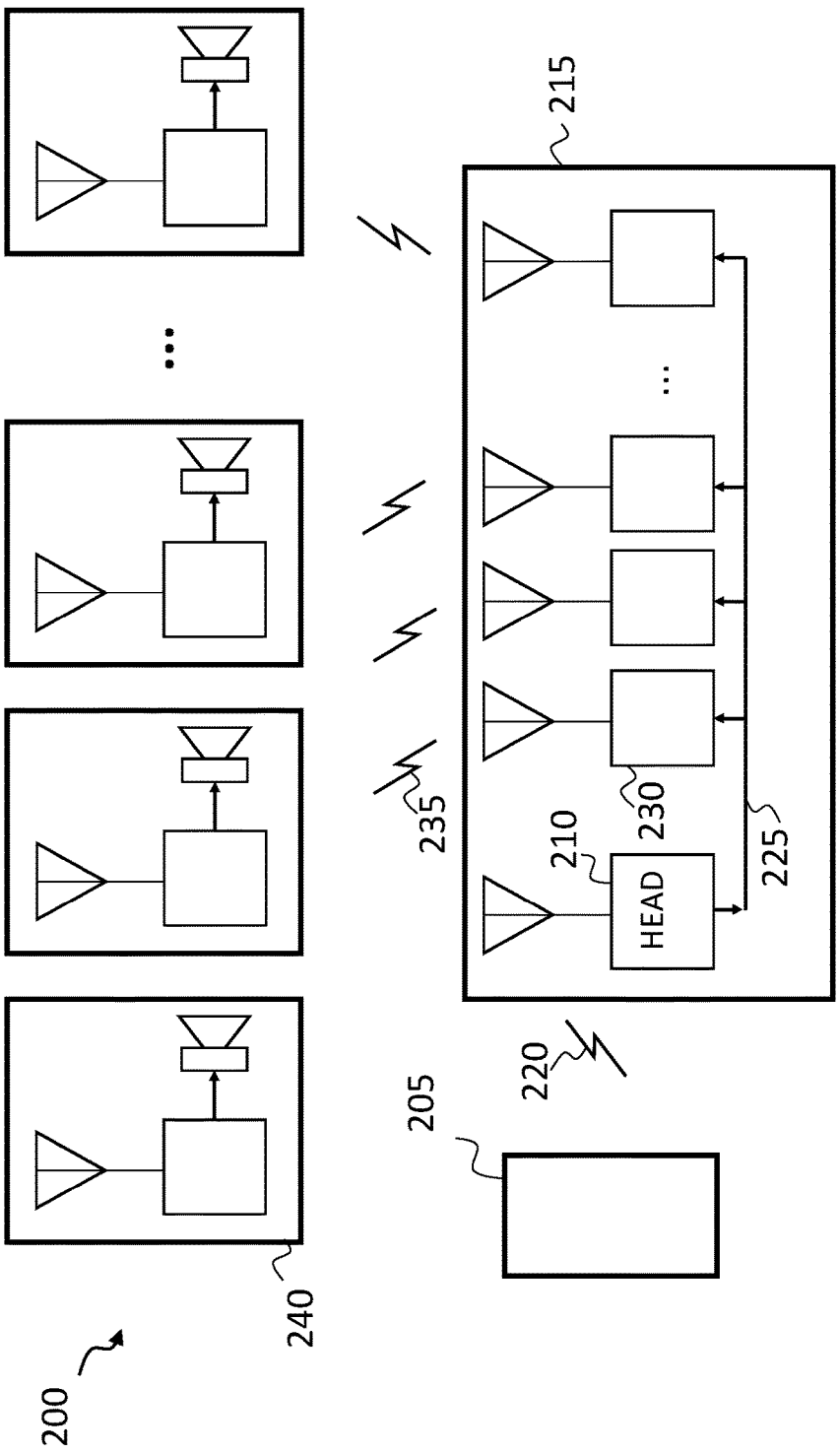
FIG. 2 depicts an exemplary WRH functional block diagram.

FIG. 2 depicts an exemplary WRH functional block diagram. A function block diagram 200 includes a WMP 205. The WMP 205 may be, for example, a Bluetooth-enabled media player, or a computer. The WMP 205 is depicted wirelessly paired to a head receiver 210. The head receiver 210 is included within a WRH system 215. The head receiver 210 is configured to receive a first wireless media data-stream modulated within a first wireless radio-frequency (RF) channel 220. The head receiver 210 is also configured to generate an audio signal 225 from the first wireless media data-stream modulated within the first wireless RF channel 220. The audio signal 225 is connected to a slave transmitter 230. As depicted, multiple slave transmitters 230 may be electrically connected in parallel to the audio signal 225 within the WRH system 215. Each of the slave transmitters 230 is individually configured to transmit a respective unique second RF channel 235. Each of the unique second RF channels 235 is operable to pair with a respective wireless speaker 240. In some embodiments, the wireless speaker 240 may be a wireless transducer. In some examples, each of the wireless speakers 240 may be operable to produce an audible representation of the media data-steam modulated within one unique second RF channel 235. Accordingly, the WRH system 215 may facilitate media data-streams modulated within the first wireless RF channel 220 from the WMP 205 to be played on multiple wireless speakers 240 via each of the unique second RF channels 235. Further, this functionality may be permitted by employment of the audio signal 225 generated by the head receiver 210 and received by multiple slave transmitters 230.

Figure 3:
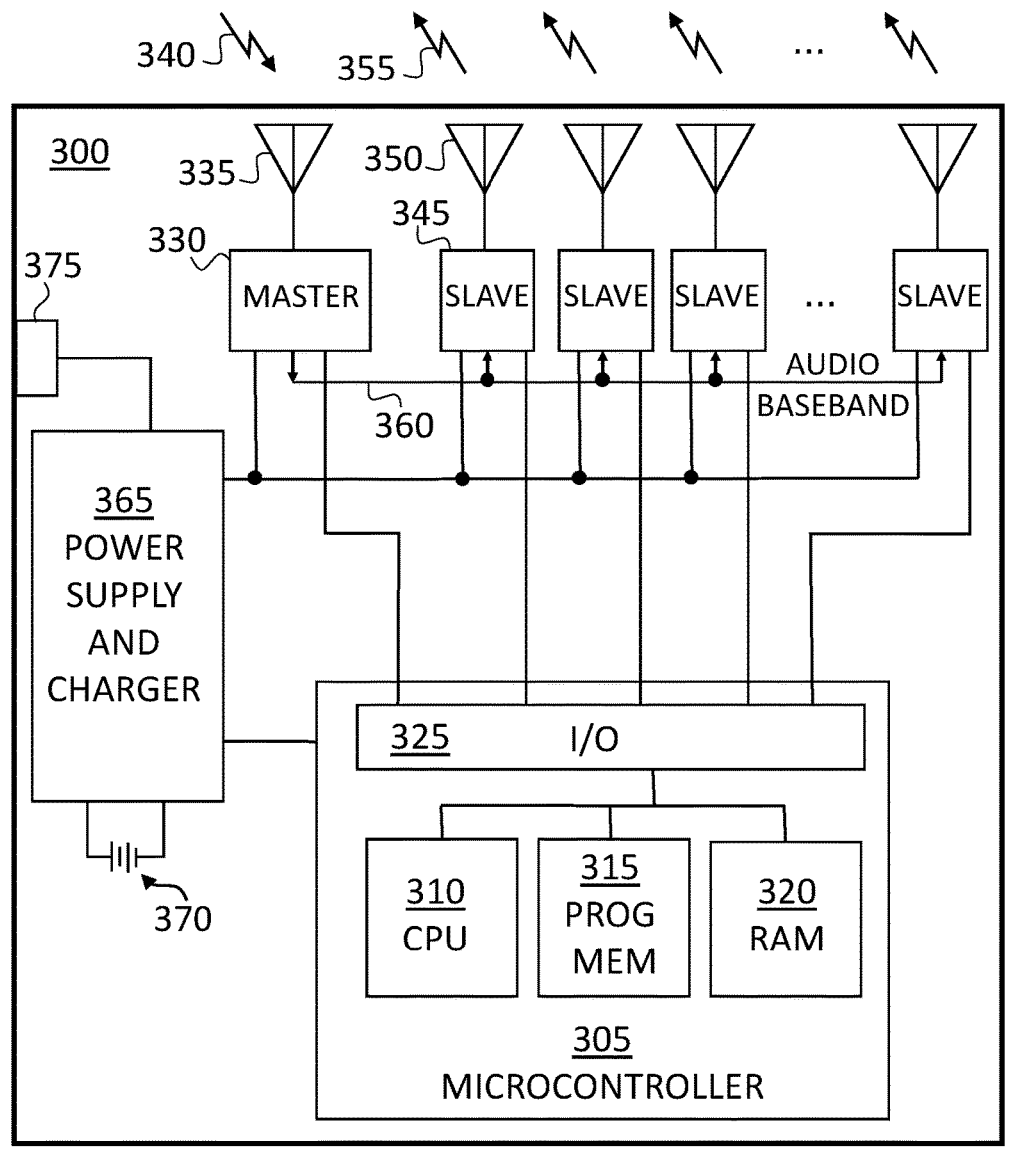
FIG. 3 depicts an exemplary WRH electrical block diagram.

FIG. 3 depicts an exemplary WRH electrical block diagram. A WRH 300 includes a microcontroller 305. The microcontroller 305 includes a central processing unit (CPU) 310. The microcontroller 305 also includes a program memory 315 and a random-access memory (RAM) 320. Finally, the microcontroller 305 includes an input/output block (I/O) 325. Within the microcontroller 305, the CPU 310 executing instructions out of the program memory 315 provides overall functionality of the microcontroller 305. The CPU 310 employs the RAM 320 as a general-purpose support memory. The microcontroller 305 may provide control signals and/or serial communication via the I/O block 325.

The microcontroller 305 is operable coupled to a master RF transceiver 330. The master RF transceiver 330 is electrically coupled to an antenna 335. The master RF transceiver 330 is operable to receive an RF communication 340 via the antenna 335. As shown in this embodiment, the master RF transceiver 330 is operable to generate and output a common audio/video baseband signal 360 demodulated from the RF communication 340 via the antenna 335.

The microcontroller 305 is also operably coupled to a slave RF transceiver 345. Each slave RF transceiver 345 is electrically coupled to a respective antenna 350. As shown in this embodiment, multiple slave RF transceivers 345 are connected in parallel through the common audio/video baseband signal 360. Each slave RF transceiver 345 is operable to transmit a respective RF communication 355 via the antenna 350. The slave RF transceivers 345 are operable to generate the RF communication 355 based on, and in response to, the common audio/video baseband signal 360 input. Accordingly, the WRH 300 may facilitate a wireless music data-stream (RF communication 340) from a WMP to be uniquely repeated and played on multiple wireless audio transducers via unique wireless channels (RF communications 355), by employment of a common audio/video baseband signal 360 generated by the master RF transceiver 330 and received by the multiple slave RF transceivers 345.

The WRH 300 also includes a power supply 365. The power supply 365 provides power to the functional blocks within the WRH 300. The power supply 365 receives input power from a battery 370. In some embodiments, when plugged into AC mains, the power supply 365 may be operable to charge the battery 370. The power supply 365 electrically couples to a power input connector 375.

In some embodiments, the WRH 300 may be powered by an off-the-shelf battery. In such embodiments, the power supply 365 may not implement the battery charging function.

The exemplary depiction in FIG. 3 includes a microcontroller 305 which may be advantageously employed to provide some level of automation. For example, various embodiments may be preprogrammed to automatically turn on, communicate with a master audio source (e.g., the master RF transceiver), and play music on the master audio source. The microcontroller 305 may also be advantageously employed to provide some level of control. For example, the WRH may employ a display with a graphic user interface (GUI) operable to control audio volume and/or tone in response to user input. In some embodiments, the microcontroller 305 may be removed. In such embodiments, the result may include the WRH system (FIG. 2, item 215) with the power supply 365, the battery 370 as well as the power input connector 375. In various embodiments, the WRH may employ a microphone, coupled to the microcontroller 305, the combination operable to adjust volume or tone in response to ambient sounds in a room, for example.

Although various embodiments have been described with reference to the figures, other embodiments are possible. For example, the WRH system may include a communications port. The communications port may connect to a personal computer and may enable various utilities such as WRH programming and various WRH configurations. In some embodiments, the WRH may not only be provided media data-streams from a WMP, but may also be provided various programming and configurations through a corresponding custom WMP application (app).

In an exemplary aspect, a wireless splitter-repeater hub system may include a personal electronic device (PED) configured to transmit a wireless media data-stream, a master transceiver configured to receive the wireless media data-stream and convert the wireless media data-stream to an audio baseband signal, and two or more slave transceivers electrically coupled to the master transceiver via an electrical coupling. The master transceiver may be configured to transmit the audio baseband signal to the slave transceivers via the electrical coupling. Each of the two or more slave transceivers may be configured to convert the received analog baseband signal into a respective point-to-point wireless media data-stream within a group of two or more point-to-point wireless media data-streams.

The system may further include two or more wireless transducers, each of the two or more wireless transducers may be configured to be paired to a respective slave transceiver via a point-to-point wireless protocol to receive two or more point-to-point wireless media data-streams. Further, each of the two or more wireless transducers may be configured to output a representation of the wireless media data stream.

The system may be further configured for a one-to-one correspondence between each of the two or more slave transceivers and each of the two or more wireless transducers (e.g., speakers). The system may be further configured such that at least one of the two or more wireless transducers may be an audio speaker. The system may be further configured such that at least one of the two or more wireless transducers may be a color bulb. The system may be further configured such that at least one of the two or more wireless transducers may be a wireless headset.

The system may be further configured such that the representation of the wireless media data stream outputs an audible representation. The system may be further configured such that the representation of the wireless media data stream outputs a visual representation. The system may be further configured such that the representation of the wireless media data stream outputs a tactile representation. The system may be further configured such that the representation of the wireless media data stream outputs a video representation.

The system may be further configured such that the wireless media data-stream comprises a wireless audio data-stream. The system may be further configured such that the wireless media data stream may be modulated within a wireless radio-frequency (RF) channel.

In an exemplary aspect, a wireless splitter-repeater hub system may include a master transceiver configured to receive a wireless media data-stream and to convert the wireless media data-stream into an audio baseband signal. The system may also include two or more slave transceivers electrically coupled to the master transceiver via an electrical coupling. The master transceiver may be configured to transmit the audio baseband signal to two or more slave transceivers via the electrical coupling. Each of the slave transceivers may be configured to convert the received audio baseband signal into a respective point-to-point wireless media data-stream within a group of two or more point-to-point wireless media data-streams.

A method for operating a wireless splitter-repeater hub system may including the following steps:

(1) Provide a master transceiver configured to receive a wireless media data-stream and convert the wireless media data-stream to an audio baseband signal.

(2) Provide two or more slave transceivers electrically coupled to the master transceiver via an electrical coupling. The master transceiver may be configured to transmit the audio baseband signal to two or more slave transceivers via the electrical coupling. Each of the slave transceivers may be configured to convert the received analog baseband signal into a respective point-to-point wireless media data-stream within a group of two or more point-to-point wireless media data-streams.

(3) Providing two or more wireless transducers, each of the two or more wireless transducers may be configured to be paired to a respective slave transceiver via a point-to-point wireless protocol to receive a respective one of the two or more point-to-point wireless media data-streams, and output a representation of the wireless media data stream.

Some aspects of embodiments may be implemented as a computer system such as an electrical circuit with an embedded microcontroller, the microcontroller including a processor, memory and various peripherals. For example, various implementations may include digital and/or analog circuitry, computer hardware, firmware, software, or combinations thereof. Apparatus elements can be implemented in an embedded computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as digital FPGA, analog FPAAs, or mixed signal FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A wireless splitter-repeater hub system comprising:
a master transceiver configured to receive a wireless media data-stream and convert the wireless media data-stream to an audio baseband signal;
a plurality of slave transceivers electrically coupled to the master transceiver, wherein the master transceiver is configured to transmit the audio baseband signal to the plurality of slave transceivers, and wherein each of the plurality of slave transceivers are configured to convert the audio baseband signal into a respective point-to-point short-range wireless media data-stream in a plurality of point-to-point short-range wireless media data-streams; and,
a plurality of wireless transducers, each of the plurality of the wireless transducers being configured to be paired to a respective slave transceiver via a point-to-point short-range wireless protocol to receive a respective one of the plurality of point-to-point short-range wireless media data-streams, and output a representation of the wireless media data stream;
wherein there is a one-to-one correspondence between each of the plurality of slave transceivers and each of the plurality of the wireless transducers.

2. The wireless splitter-repeater hub system of claim 1, wherein the plurality of point-to-point short range wireless media data streams comprise Bluetooth wireless media data streams.

3. The wireless splitter-repeater hub system of claim 1, wherein at least one of the plurality of wireless transducers is an audio speaker.

4. The wireless splitter-repeater hub system of claim 1, wherein at least one of the plurality of wireless transducers is an audio headset.

5. The wireless splitter-repeater hub system of claim 1, wherein outputting the representation of the wireless media data stream comprises outputting an audible representation.

6. The wireless splitter-repeater hub system of claim 1, wherein outputting the representation of the wireless media data stream comprises outputting a visual representation.

7. The wireless splitter-repeater hub system of claim 1, wherein outputting the representation of the wireless media data stream comprises outputting a tactile representation.

8. The wireless splitter-repeater hub system of claim 1, wherein the wireless media data-stream comprises a wireless audio data-stream.

9. The wireless splitter-repeater hub system of claim 1, wherein the wireless media data stream is modulated within a wireless radio-frequency channel.

10. A wireless splitter-repeater hub system comprising:
a master transceiver configured to receive a wireless media data-stream and convert the wireless media data-stream to an audio baseband signal;
a plurality of slave transceivers electrically coupled to the master transceiver, wherein the master transceiver is configured to transmit the audio baseband signal to the plurality of slave transceivers, and wherein each of the plurality of slave transceivers are configured to convert the audio baseband signal into a respective point-to-point short-range wireless media data-stream in a plurality of point-to-point short-range wireless media data-streams,
wherein each slave transceiver in the plurality of slave transceivers is adapted to pair with a respective wireless transducer in a plurality of wireless transducers via a respective point-to-point short-range wireless media data stream in the plurality of point-to-point short-range wireless media data-streams.

11. The wireless splitter-repeater hub system of claim 10, wherein the plurality of point-to-point short range wireless media data streams comprise Bluetooth wireless media data streams.

12. The wireless splitter-repeater hub system of claim 10, wherein the wireless media data-stream comprises a wireless audio data-stream.

13. The wireless splitter-repeater hub system of claim 10, further comprising a personal electronic device configured to transmit the wireless media data-stream.

14. A method for operating a wireless splitter-repeater hub system comprising the steps of:
providing a master transceiver configured to receive a wireless media data-stream and convert the wireless media data-stream to an audio baseband signal;
providing a plurality of slave transceivers electrically coupled to the master transceiver, wherein the master transceiver is configured to transmit the audio baseband signal to the plurality of slave transceivers, and wherein each of the plurality of slave transceivers are configured to convert the audio baseband signal into a respective point-to-point short-range wireless media data-stream in a plurality of point-to-point short-range wireless media data-streams,
wherein each slave transceiver in the plurality of slave transceivers is adapted to pair with a respective wireless transducer in a plurality of wireless transducers via a respective point-to-point short-range wireless media data stream in the plurality of point-to-point short-range wireless media data-streams.

15. The wireless splitter-repeater hub system of claim 14, wherein the plurality of point-to-point short range wireless media data streams comprise Bluetooth wireless media data streams.

16. The wireless splitter-repeater hub system of claim 14, wherein the wireless media data-stream comprises a wireless audio data-stream.

* * * * *